United States Patent [19]

Erasmus

[11] Patent Number: 5,126,162
[45] Date of Patent: Jun. 30, 1992

[54] NUTRITIONAL FORMULA

[76] Inventor: Celia Erasmus, 338 Edna Street, Lynnwood Park, Pretoria, South Africa

[21] Appl. No.: 564,081

[22] Filed: Aug. 8, 1990

[30] Foreign Application Priority Data

Aug. 8, 1989 [ZA] South Africa ............. 89/603258
Jul. 24, 1990 [WO] PCT Int'l Appl. ... PCT/GB90/01140

[51] Int. Cl.$^5$ .............................................. A23L 2/38
[52] U.S. Cl. ..................................... 426/657; 426/72; 426/74; 426/801; 426/804
[58] Field of Search ............... 426/801, 804, 657, 72, 426/74

[56] References Cited

U.S. PATENT DOCUMENTS

| | | | |
|---|---|---|---|
| 2,717,835 | 9/1955 | Brady | 426/657 |
| 2,953,456 | 9/1960 | Mohler | 426/657 |
| 3,062,655 | 11/1962 | Staackmann | 426/804 |
| 3,068,828 | 10/1962 | Lindbead | 426/657 |
| 4,024,286 | 5/1977 | Cornelius | 426/657 |
| 4,259,361 | 3/1981 | Proctor | 426/657 |
| 4,298,601 | 11/1981 | Howard | 426/804 |
| 4,389,423 | 6/1983 | Madsen | 426/657 |
| 4,414,238 | 11/1983 | Schmidl | 426/602 |
| 4,610,814 | 9/1986 | Dede | 426/657 |
| 4,670,268 | 6/1987 | Mahmoud | 426/72 |
| 4,692,340 | 9/1987 | Grutte | 426/657 |
| 4,861,602 | 8/1989 | Ucheda | 426/657 |
| 5,039,532 | 8/1991 | Jost | 426/657 |
| 5,064,674 | 11/1991 | Girsh | 426/801 |

FOREIGN PATENT DOCUMENTS 1264898 10/1986 U.S.S.R. .
2060644 5/1981 United Kingdom .

*Primary Examiner*—Carolyn Paden
*Attorney, Agent, or Firm*—Oblon, Spivak, McClelland, Maier & Neustadt

[57] ABSTRACT

There is disclosed a hypoallergenic (oligoantigenic) nutritional formula comprising a homogeneous powder of such fineness that it will form a water suspension resembling milk which will have acceptable stability, will keep fresh in a refrigerator after allementation for approximately 24 hours and will not block a standard feeding teat, comprising meat selected for its low allergenicity as the sole or substantially the sole source of protein content together with lipid and carbohydrate additives, and a vitamin and mineral content, all in such proportions as will constitute a nutritionally balanced food which may be regarded as hypoallergenic and/or oligoantigenic.

14 Claims, No Drawings

NUTRITIONAL FORMULA

This invention relates to a hypoallergenic (oligoantigenic) nutritional formula such as may be used for infants and other with allergies and/or digestive problems and/or malnutrition and/or hyperactivity; and/or migraine.

The incidence of food allergy in the paediatric population may be as high as 38%, according to some studies. The incidence of allergy is highest in infancy and childhood and decreases with age. Cow's milk is the most common allergen, affecting approximately 7% of the general paediatric population and possibly up to 30% of allergic children. Generally, when a patient presents with an allergy to cow's milk, a soya-based formula is prescribed. Yet soya allergy occurs in approximately 10-30% of children who are allergic to cow's milk. There is also an allergic cross-reaction between goat's milk and cow's milk. Goat's milk is not usually recommended, for children under the age of six months.

BACKGROUND OF THE INVENTION

Special hypoallergenic formulas are commercially available based on hydrolyzed protein, but they can be expensive and unpalatable—infants may refuse them.

One example of such formulas is to be found in U.S. Pat. No. 4,670,268. which explains that protein hydrolysates, comprising short peptide fragments and/or free amino acids have been found to be less immunogenic or allergenic than intact proteins. The immunogenicity of the formula depends, it is stated, largely on the extent of hydrolysis of the selected protein hydrolysate. and the patent recommends that the protein hydrolysate should be extensively hydrolyzed to yield very short peptides and free amino acids.

As noted in U.S. Pat. No. 4,670,268, however, the extensively digested and hypoimmunogenic protein hydrolysates have the undesirable characteristic of loss of capacity to emulsify fat and form physically stable emulsions that do not separate during storage. As stated in U.S. Pat. No. 4,670,268. another common problem encountered in the preparation of hypoallergenic formulas is the formation of undesirable brown colour as a result of the reaction between the carbonyl groups of reducing sugars and the nitrogen-amine containing compounds such as amino acids in the formula (Maillard type reaction) especially at elevated temperatures encountered during sterilization.

In common with U.S. Pat. No. 4,414,238, which is referred to in U.S. Pat. No. 4,670,268, the use of a low dextrose equivalent hydrolyzed starch is particularly recommended to minimise Maillard type reactions and brown colour formation, and the inclusion of octenyl succinic anydride modified starch is prescribed in order to form a stable emulsion.

U.S. Pat. No. 4,670,268 recommends further supplementation of the hydrolyzed protein source with various free amino acids to provide a nutritionally balanced amino acid content.

The formulas of both U.S. Pat. Nos. 4,670,268 and 4,414,238 are primarily intended to be supplied in ready-to-use liquid form, although U.S. Pat. No. 4,670,268 mentions the possibility of concentration and of supplying in powder form for reconstitution by adding water prior to feeding.

While doubts have been raised about the use of octenyl succinic anhydride, probably the main problems with hydrolysed hypoallergenic formulas are that they could be expensive, and not always very palatable.

SUMMARY OF THE INVENTION

The present invention provides a novel hypoallergenic (oligoantigenic) nutritional formula which does not have the aforementioned disadvantages.

The invention provides a hypoallergenic/(oligoantigenic) nutritional formula in a form which resembles milk in appearance and stability, or which can be made to resemble milk through a process of realimentation such as for example the addition of a liquid such as water.

The invention provides an hypoallergenic (oligoantigenic) nutritional formula comprising a homogeneous powder of such fineness that it will form a water suspension resembling milk which will have acceptable stability, will keep fresh in a refrigerator after allementation for approximately 24 hours and will not block a standard feeding teat. The formula comprises muscle protein and/or meat selected for its low allergenicity as the sole or substantially the sole protein content together with lipid and carbohydrate additives, and a vitamin and mineral content. all in such proportions as will constitute a nutritionally balanced food.

By selecting the muscle protein and/or meat for its low allergenicity, hydrolysis probably becomes unnecessary, and in the best mode of the invention to be more particularly described hereinafter, the protein is not hydrolysed at all, though the possibility of using hydrolyzed muscle protein and/or meat is not excluded.

The protein may be derived from the muscle protein and/or meat of domesticated animals such as pork, beef/veal, mutton/lamb; from poultry, e.g. turkey, chicken, duck and from other birds e.g. pigeon; and possibly from fish, marsupials e.g. kangaroo etc; and even reptiles e.g. crocodile etc. Whilst something is known of the allergenicity of the common types of meat and fish it would be necessary to carry out trials in order to establish the allergenicity of the more exotic protein sources before they are used.

At this juncture it should be noted that some patients exhibit food intolerance—for present purposes, this and allergy may be considered equivalent conditions, inasmuch as they most probably are connected with the same or similar foods. The formula of the present invention is equally efficacious for either condition.

It should also be noted that it can by no means be claimed that allergies and food intolerance are perfectly understood, and it may well be the case that the incidence of intolerance and allergic reaction fo a particular foodstuff will be different in different groups of people.

What appears to be generally true, however, is that pure muscle protein and/or meat (i.e. no skin, fat, bone or offal inclusions) has a lower allergenicity than dairy or soya products, and some muscle, particularly turkey breast meat, gives rise to a very low incidence indeed of allergic reaction and intolerance.

Whilst turkey breast meat, on that account, and on account of the fact that it is (or could be arranged to be) plentiful and inexpensive, would be the preferred choice in many countries, in other countries the choice might be different.

Since there is a reasonable choice of convenient muscle protein and/or meat sources of low allergenicity that would be feasible on economic grounds, it would be quite possible to make available two or more different formulas, for example of turkey and/or chicken; lamb, so that almost nobody should be allergic to all of them, and most would be allergic to none of them.

It should be noted here that U.S. Pat. No. 4,670,268 above-mentioned refers to animal protein hydrolysates as being suitable for inclusion in the formula therein disclosed, but does not suggest that muscle protein would be suitable without hydrolysis. U.S. Pat. No. 1,557,053 discloses a finely divided animal meat-based food product which can be mixed with water to make an infant food. The only "meat" disclosed therein, however, is animal liver, and indeed that patent is not at all concerned with allergies or food intolerance, even suggesting that the powder can be mixed with milk.

The only other available product of which Applicant is aware is a chicken-based infant food which is not presented in powder form for reconstitution and which is not suitable for infant feeding if used as the sole source of nutrition.

Using the presently-preferred turkey breast meat, there is no problem with regard to taste or palatability. If, for any reason, it is desired to use a strong tasting meat, such as fish or a game meat such as venison, it is possible, in ways already known in the food processing industry, to reduce or eliminate the taste, so that there should be no barrier on that account to the use of any available muscle protein source.

The remainder of the ingredients are already used in other food products. Their selection, and the relative quantities in which they are used should, however, be such as will result in a nutritionally balanced diet, and by that will usually be meant that the diet will, given in sufficient quantity, contain all the necessary elements for the sustenance and normal growth and development of the patient when used as the sole source of nutriment, all according to recommendations in recognised health regulations such as FDA and ESPGAN.

The choice of lipid is wide, but sunflower/safflower oil and coconut oil are particularly recommended from a nutritional point of view. However, use of other lipid sources such as palmkernel oil, corn/maize oil, olive oil and butterfat etc and mixtures thereof is not excluded.

A recommended form of carbohydrate is hydrolised corn/maize starch, comprising glucose, maltose and oligosaccharides consisting of, preferably, up to a maximum of 5 monosaccharide units. The use of other carbohydrate sources known in the food industry is not excluded. Possible examples include one or more of the following: fructose; maltose; sucrose; and other sources of maltodextrins and/or hydrolised starch and/or modified starch (e.g. tapioca, rice); glucose made from hydrolised maize/corn starch, cane sugar or any other appropriate source of glucose.

In order that the formula shall contain an adequate supply of vitamins, such may be added to it, viz vitamins A, $B_1$, $B_2$, $B_6$, $B_{12}$, D, E and $K_1$, nicotinic acid, biotin, folic acid and panthotenic acid, to achieve a sufficient level where the remainder of the ingredients fail to provide same. Likewise, minerals such as magnesium chloride, ferrous, cupric, manganese and zinc sulphates, potassium carbonate, sodium citrate, potassium iodate, calcium phosphate and calcium carbonate may be added as necessary. Alternative mineral salts may be substituted as necessary without departing from the spirit or scope of this patent application and invention.

The invention also comprises a method for making the hypoallergenic (oligoantigenic) nutritional formula in which raw muscle protein and/or meat is finely comminuted and cooked in water.

The raw muscle and/or meat may be comminuted directly from the frozen state. The comminution may be carried out in stages—the muscle and/or meat may first be cut into convenient-sized pieces, say 5 cm cubes or smaller, then, with lecithin, fats and fat-soluble vitamins and minerals added, comminuted in a three blade bowl-cutter or similar apparatus. The thus-comminuted meat may then be subject to further comminution in a 200 blade microcut head cutter or similar apparatus. The raw muscle and/or meat is preferably tempered to about $-3°$ C. before cutting into blocks and will warm up during the comminution stages. The product of the final comminution stage is then cooked in water, after which water-soluble vitamins may be added, together with any fat-soluble vitamins as necessary.

The mass is then processed in a colloid mill, after which it is dried to a powder, as by spray-drying, which is the finished product ready for packaging, which is preferably done under nitrogen flush, in any appropriate fashion.

Clearly, the manufacturing process should at all stages be carried out according to current good manufacturing practice in manufacturing, packing or holding of human food, the usual regard being had to the purity of the ingredients, the freshness of the meat or other muscle protein source, cooking temperature and duration and processing and standing times to minimize the bacterial load in the final product. Proper regard should also be given to the sanitary condition of all apparatus.

One embodiment of the formula and a method for its preparation will now be described more particularly in the following Example.

FORMULATION

Quantities quoted may be adjusted as necessary without departing from the spirit or scope of this patent application and invention.

| Component (Content/100 ml final product) | Mass |
|---|---|
| Protein source: Turkey breasts, boneless, skinless | 7.803–8.624 g |
| Energy: | 280–290 kj ($\pm$285 kj) |
| Fat: | |
| Sunflower oil | 0.400–1.925 g |
| Coconut oil | 1.575–3.100 g |
| Carbohydrates: Hydrolised corn starch D.E. 35-39 (glucose, maltose and oligosaccharides up to a maximum of 5 monosacchride units) | 7.200 g |
| Lecithin (Central 3 FSB) | 0.500 g |
| Vitamins | 0.008 g |
| Minerals | 0.502 g |
| Vitamins (quantities quoted may be adjusted as necessary without departing from the spirit or scope of this patent application and invention): | |
| Fat Soluble: | |
| Vitamin A Palmitate | 200.0 IU |
| Vitamin $D_3$ | 40.0 IU |
| Vitamin E (dl-A-tocopherol) | 1.5 mg |
| Vitamin $K_1$ | 10.0 mcg |
| Water soluble: | |
| Vitamin C (ascorbic acid) | 5.5 mg |
| Vitamin $B_1$ (thiaminehydrochloride) | 67.0 mcg |

-continued

| Component (Content/100 ml final product) | Mass |
|---|---|
| Vitamin B$_2$ (riboflavin) | 100.0 mcg |
| Nicotinamide | 0.9 mg |
| d-Biotin | 3.5 mcg |
| Folic acid | 5.0 mcg |
| Ca-d-pantothenate | 300.0 mcg |
| Pindoxine Hydrochloride | 42.0 mcg |
| Vitamin B$_{12}$ (cobalamine) | 0.2 mcg |
| Minerals (quantities quoted may be adjusted as necessary without departing from the spirit or scope of this patent application and invention): | |
| Magnesium chloride | 108.70 mg |
| Ferrous sulphate | 5.75 mg |
| Cupric sulphate | 0.90 mg |
| Manganese sulphate | 0.08 mg |
| Zinc sulphate | 1.52 mg |
| Potassium carbonate | 74.00 mg |
| Sodium citrate | 69.00 mg |
| Potassium iodate | 0.00785 mg |
| Calcium phosphate | 222.40 mg |
| Calcium carbonate | 20.50 mg |

METHOD

One possible method is described for preparing the formula, however variations to this method may be recognised and implemented without departing from the sprit or scope of this invention.

PREPARATION

Weighing Procedure

Certain ingredients may be weighed out, preferably within 12 hours, and not more than 24 hours, prior to processing the hypoallergenic (oligoantigenic) formula. Proper regard should be given to appropriate sanitary regulations.

1) Weigh out carbohydrate i.e. hydrolised corn starch and keep in appropriate container.
2) Weigh out minerals and keep in appropriate container.
3) Weigh out Lecithin and keep in appropriate container.
4) Weigh out water soluble Vitamins and keep in appropriate container.

These vitamins include:
Ascorbic acid
Thiamine hydrochloride
Riboflavin
Nicotinamide
d-Biotin
Folic acid
Ca-d-pantothenate
Piridoxine hydrochloride
Cobalamine (Vit B$_{12}$)

PROCESSING

Processing of Protein Source

The protein, in the form of raw, frozen, skinless, boneless turkey breasts, is tempered to about $-3°$ C. (the protein should still be frozen to minimise microbiological loads). The frozen meat is cut into 5 cm (or smaller) cubes by any convenient mechanical means. The proper amount is weighed out and placed in a bowlcutter (a Scharfin bowlcutter with 3 blades, or similar equipment may be used). The meat particle size is reduced (comminuted) at the highest available speed.

Preparation of Oil Blend

The oils and fat soluble vitamins may be prepared concurrently with the above comminution. If this is not possible, it should be done just prior to processing the meat.

Weighing Out Procedure

1) Weigh out the correct quantity of coconut oil and set aside.
2) Weigh out the correct quantity of sunflower/safflower oil and set aside.
3) Weigh out the fat soluble Vitamins and keep in appropriate container(s).

These vitamins include:
Vit A palmitate
dl-A-tocopherol acetate
Vit D$_3$
Vit K$_1$

Blending Procedure

1) Heat the coconut oil to its melting point (approximately 40°-50° C.).
2) Mix the sunflower/safflower oil and minerals.
3) Add the sunflower/safflower and mineral mixture to the heated coconut oil.
4) Maintain the temperature of the coconut/sunflower (safflower)/mineral mix at 40°-50° C.
5) Add the fat soluble vitamins to the oil mix and blend.
6) Set aside this new oil blend, maintaining its temperature at 40°-50° C., until used.

Mixing Procedure and Further Size Reduction

The following are added in sequence to the meat while it is being processed in the bowlcutter.
1) Lecithin
2) Oil, mineral and fat-soluble vitamin blend.
3) Hydrolised starch (as the dry powder).
4) No water is added at this stage.

The total time for the process if approximately 20 minutes, during which time the temperature of the mixture will rise, but should be kept below 30° C.

The mixture resulting from this first comminution stage is a homogeneous mass still containing fibres with particle sizes not small enough to provide a stable diluted product.

The mixture is then passed through a second size reduction stage, in an Urschel Comitrol (Model 1700) with a microcut head with 200 blades or similar comminuting machine. The temperature of the mixture at this stage will be about 25° C. or less since in general higher mixture viscosities improve size reduction in this apparatus.

Water is then added to dilute the mixture to approximately 50% solids content, or whatever solids content is required by the particular spraydrier which will be used later in the process.

The mixture is then transferred to a double-walled, steamheated, preferably closed cooking vessel of appropriate size and cooked for at least 35 minutes but not more than 60 minutes at 96° C., or the boiling point of the mixture at atmospheric pressure. To prevent burn-on the mixture must be continuously stirred and removed from the walls of the vessel.

Water soluble vitamins, dissolved in a small amount of water, are added to the mixture about 5 minutes before the end of the cooking process, and mixed thoroughly into the mixture to assure uniform dispersion.

Provision may have to be made to compensate for any losses of water soluble vitamins and other components experienced during processing. This is done, for example, by analysing the mixture of certain stages whilst processing and adjusting the amounts added for subsequent batches. There should, as in all processes of this nature, be constant monitoring of the raw materials and of the product at all stages to ensure purity, quality and conformity to specification.

After the cooking process, the mixture is subjected to further size reduction in order to process it into a homogeneous mass—the mixture tends to coagulate during the cooking process. This further size reduction is effected in a colloid mill such as a PUC Vikosator Type JV10, PUC Kolloidtechnik, Probst & Class GmbH, West Germany or an Urschel Comitrol machine etc. The temperature of the mixture at this stage is about 70°–80° C.

The mixture can at this stage be transferred to a holding vessel but the temperature of the mixture should be maintained at about 70°–80° C. and it should be stirred continuously prior to spraydrying.

The mixture then passes through a spraydrying process during which conditions are maintained so as to result in a dry product, containing the required nutrients and other product characteristics. In a pilot scale spraydrier with a Niro atomiser, the following conditions were found to be appropriate:

| | |
|---|---|
| Air inlet temperature | 180° C. |
| Air outlet temperature | 80–85° C. |
| Mixture temperature in | 60° C. |
| Product temperature out | 48–52° C. |
| Solids content in | about 50% |
| Moisture content of product out | 1–3% |

The appropriate pump speed for feeding the mixture should be selected according to the requirements of the specific spraydrier to maintain the above conditions.

The product can then be packed appropriately for market needs, for example in hermetically sealed metal cans, containing a scoop to measure out amounts necessary to make up a liquid feed of the correct consistency and labelled according to recognised Health Regulations. The hypoallergenic (oligoantigenic) formula is preferably marketed in powder form. However, it may also be sold in ready-to-feed liquid form if processed to render it suitable for this aim, and packaged appropriately.

Samples made according to the above Example had very acceptable microbiological quality according to recognised Health Regulations. It is found that the formula specifically described will keep for at least 24 hours under normal refrigeration, exactly as would fresh cow's milk or any other similar nutritional formula.

Commercial production would require not only that the method as described in the Example be appropriately scaled up. To maintain the quality of the final product in industrial processing, the total processing time should be kept as short as possible, and no unnecessary delays should occur. If appropriate, delays may be lessened, by use of more than one of each of the pieces of equipment mentioned, so that time-overlaps may be utilised.

Whilst the Example is illustrative of the preparation of a very satisfactory hypoallergenic (oligoantigenic) formula which is nutritionally balanced, it is to be observed that variations in both the composition and method can be made within the scope of the invention as defined in the appended claims.

It has already been mentioned that other suitable hypoallergenic (oligoantigenic) muscle and/or meat may be substituted for all or part of the turkey breast meat.

Of equal importance to what the formula contains, of course, is what it does not contain. Clearly, all notorious allergens should be avoided, such, for example, as gluten and gluten products and wheat, which contains gluten, and its products, hens' eggs and products thereof, cows' milk and products, and soya protein. Goat's milk and its products should normally be avoided for feeds of infants under the age of 6 months. Sugars such as sucrose and lactose should be avoided in certain circumstances. Generally speaking, there should be no need to add colourants, preservatives and flavourings, whether natural or artificial, or stabilisers or emulsifiers, nor should there be a need to add free amino acids or peptides. While nothing is necessarily excluded, it probably is best to keep the list of ingredients as short as possible. Each added ingredient to which even a few infants may be allergic, or intolerant, will increase the overall allergenicity or intolerance of the product. Different infants may be allergic to different substances and so the allergenicity of the product may tend towards the sum of the allergenicities of its constituents, rather than remaining at that of its most allergenic component.

The hypoallergenic (oligoantigenic) nutritional formula of the invention may be used, specially formulated if necessary, to constitute a nutritionally balanced food for different ages or types of patient and for purposes other than infant feeding. Thus a formula may be a total or a supplementary feed, and may be used for all ages of patient with food allergy or intolerance and especially as the basis of a hypoallergenic or oligoantigenic diet.

The formula may be used in cases of colic; chronic diarrhoea; lactose intolerance; gluten sensitivity; fermentation diarrhoea; malabsorption of certain food constituents; malnutrition; and protein-calorie malnutrition such as kwashiorkor, marasmus etc, and galactosaemia.

It may be used for tube feeding and in geriatric cases.

This formula may also be used for patients with hyperactivity/hyperkinetic syndrome or migraine.

Other indications will no doubt occur to those familar with this field.

I claim:

1. A method for making a hypoallergenic (oligoantigenic) nutritional formula comprising the steps:
   a) comminuting at least one of muscle and meat;
   b) adding at least one additive selected from the group consisting of lecithin, lipid, fat-soluble vitamins, minerals and carbohydrates prior to the completion of comminution;
   c) cooking the comminuted muscle meat mixture in water;
   d) adding at least one additive selected from the group consisting of water-soluble vitamins and fat-soluble vitamins, near the end of cooking;
   e) processing the cooked mass in a colloid mill;
   f) drying the cooked mass to a powder; and
   g) packaging the dried powder under a nitrogen flush.

2. A method according to claim 1, in which the muscle meat comprises unhydrolyzed, natural protein.

3. A method according to any one of claims 1 to 2, in which the muscle or meat is mammalian.

4. A method according to claim 3, in which the muscle or meat comprises pork, lamb/mutton, veal/beef.

5. A method according to claim 2, in which the protein comprises muscle or meat from poultry or other birds.

6. A method according to claim 5, in which the protein comprises turkey.

7. A method according to any one of claims 1 to 2, in which the muscle or meat comprises fish.

8. A method according to any one of claims 1 to 2, in which the muscle or meat comprises reptilian meat, game or marsupials.

9. A method according to any one of claims 1 to 2, in which the lipid is selected from sunflower oil, safflower oil, corn oil, maize oil, palm kernel oil, coconut oil, butterfat and mixtures thereof.

10. A method according to any one of claims 1 to 2, in which the carbohydrate is selected from sucrose, fructose, maltose, malto dextrin, glucose made from hydrolyzed corn/maize starch, cane sugar and hydrolyzed or modified starch from corn, maize, rice or tapioca, and mixtures thereof.

11. A method according to any one of claims 1 to 2, in which the added vitamins are selected from the group consisting of vitamins A, $B_1$, $B_2$, $B_6$, $B_{12}$, D, E and $K_1$, nicotinic acid, biotin, folic acid and pantothenic acid.

12. A method according to any one of claims 1 to 2, in which the added minerals are selected from the group consisting of magnesium chloride, ferrous, cupric, manganese and zinc sulphates, potassium carbonate, sodium citrate, potassium iodate, calcium phosphate and calcium carbonate.

13. A method according to claim 1, in which the muscle is comminuted directly from the frozen stage.

14. A method according to claim 1, in which the cooked mass is dried to a powder by spraydrying.

* * * * *

UNITED STATES PATENT AND TRADEMARK OFFICE
CERTIFICATE OF CORRECTION

PATENT NO. : 5,126,162

DATED : June 30, 1992

INVENTOR(S) : Celia Erasmus

It is certified that error appears in the above-identified patent and that said Letters Patent is hereby corrected as shown below:

TITLE PAGE:
The Foreign Application Priority Data is incorrect. [30], should be, --Aug. 8, 1989 [ZA]  South Africa.................89/6032

Jul. 24, 1990 [WO]  PCT Int'l Appl. ...........PCT/GB90/01140--.

Signed and Sealed this

Twentieth Day of July, 1993

Attest:

MICHAEL K. KIRK

Attesting Officer

Acting Commissioner of Patents and Trademarks